(12) United States Patent
Mizuno et al.

(10) Patent No.: US 11,396,844 B2
(45) Date of Patent: Jul. 26, 2022

(54) FAN BLADE, ENGINE, AND STRUCTURE WITH ANTI-ICING AND DE-ICING FUNCTIONS

(71) Applicant: JAPAN AEROSPACE EXPLORATION AGENCY, Tokyo (JP)

(72) Inventors: Takuya Mizuno, Tokyo (JP); Masahiro Hojo, Tokyo (JP); Masaya Suzuki, Tokyo (JP)

(73) Assignee: Japan Aerospace Exploration Agency, Tokyo (JP)

(*) Notice: Subject to any disclaimer, the term of this patent is extended or adjusted under 35 U.S.C. 154(b) by 113 days.

(21) Appl. No.: 16/772,524

(22) PCT Filed: Sep. 25, 2018

(86) PCT No.: PCT/JP2018/035378
§ 371 (c)(1),
(2) Date: Jun. 12, 2020

(87) PCT Pub. No.: WO2019/116671
PCT Pub. Date: Jun. 20, 2019

(65) Prior Publication Data
US 2020/0386159 A1  Dec. 10, 2020

(30) Foreign Application Priority Data
Dec. 15, 2017  (JP) .............. JP2017-240788

(51) Int. Cl.
*F02C 7/047* (2006.01)
*F04D 29/02* (2006.01)
(Continued)

(52) U.S. Cl.
CPC .......... *F02C 7/047* (2013.01); *F04D 29/023* (2013.01); *B64D 2033/0233* (2013.01);
(Continued)

(58) Field of Classification Search
CPC . B64D 2033/0233; F01D 25/02; F01D 5/147; F01D 5/282; F01D 5/286;
(Continued)

(56) References Cited

U.S. PATENT DOCUMENTS 5,281,091 A * 1/1994 Dooley ................. F02C 7/047
244/134 D
7,789,620 B2 * 9/2010 Vontell, Sr. ............ F01D 5/18
415/178
(Continued)

FOREIGN PATENT DOCUMENTS

JP  2012-026381 A  2/2012
WO  WO-2008/087861 A1  7/2008

OTHER PUBLICATIONS

Office Action dated Jul. 7, 2021 in Japanese Application No. 2017-240788, along with its English translation.
(Continued)

*Primary Examiner* — Jesse S Bogue
(74) *Attorney, Agent, or Firm* — Saliwanchik, Lloyd & Eisenschenk

(57) ABSTRACT

[Object] To provide a fan blade, an engine, and a structure with anti-icing and de-icing functions, which are capable of efficiently performing anti-icing or de-icing with a simple structure.
[Solving Means] A fan blade 8 is disposed on an air inlet 4 side of a jet engine 1 of an aircraft. The fan blade 8 includes a fan blade main body 21 made of a carbon fiber reinforced plastic (CFRP), and a pair of energizing units 31 and 32 that are provided on a leading edge 24 side and a trailing edge 25 side of a heating region 36 of the fan blade main body 21 and pass current through the fan blade main body 21. Voltage is applied between the pair of energizing units 31 and 32 and
(Continued)

current passes through the fan blade main body 21 to heat the fan blade main body 21, thus performing anti-icing or de-icing.

7 Claims, 18 Drawing Sheets

(51) Int. Cl.
    *B64D 33/02*     (2006.01)
    *F01D 25/02*     (2006.01)
    *F04D 29/38*     (2006.01)

(52) U.S. Cl.
    CPC ............ *F01D 25/02* (2013.01); *F04D 29/388* (2013.01); *F05D 2220/323* (2013.01); *F05D 2240/121* (2013.01); *F05D 2240/303* (2013.01); *F05D 2240/307* (2013.01)

(58) Field of Classification Search
    CPC ........ F02C 7/047; F04D 19/00; F04D 29/023; F04D 29/324; F04D 29/388; F04D 29/584; F05D 2220/323; F05D 2220/36; F05D 2240/121; F05D 2240/303; F05D 2240/304; F05D 2240/307; F05D 2300/224; F05D 2300/603; Y02T 50/60
    See application file for complete search history.

(56) References Cited

U.S. PATENT DOCUMENTS

| | | | | |
|---|---|---|---|---|
| 8,006,934 | B2* | 8/2011 | Alexander | ............ F02C 7/047 244/134 D |
| 9,133,714 | B2* | 9/2015 | Vontell | ...................... F01D 5/18 |
| 9,673,554 | B2* | 6/2017 | Gaffiero | ................ H01R 13/46 |
| 10,745,099 | B2* | 8/2020 | Long | ......................... B32B 5/26 |
| 2007/0210073 | A1 | 9/2007 | Hubert et al. | |
| 2013/0032671 | A1 | 2/2013 | Giles et al. | |
| 2016/0230774 | A1* | 8/2016 | Whitehurst | ............. F01D 5/147 |
| 2016/0312793 | A1 | 10/2016 | Robertson et al. | |
| 2016/0353523 | A1* | 12/2016 | Jarvinen | ................ F01D 25/02 |

OTHER PUBLICATIONS

International Search Report dated Nov. 6, 2018 in International Application No. PCT/JP2018/035378.
Office Action dated Oct. 14, 2021 in Japanese Application No. 2017-240788.

* cited by examiner

FAN BLADE, ENGINE, AND STRUCTURE WITH ANTI-ICING AND DE-ICING FUNCTIONS

CROSS-REFERENCE TO RELATED APPLICATIONS

This application is the U.S. national stage application of International Patent Application No. PCT/JP2018/035378, filed Sep. 25, 2018, which claims the benefit under 35 U.S.C. §119 of Japanese Patent Application No. 2017-240788, filed Dec. 15, 2017, the disclosures of each of which are incorporated herein by reference in their entirety.

TECHNICAL FIELD

The present invention relates to a fan blade, an engine, and a structure with anti-icing and de-icing functions, which are used in an aircraft, for example.

BACKGROUND ART

An aircraft makes flights in a low-temperature environment at high altitude, and thus an icing phenomenon occurs. For that reason, an airframe or an engine is equipped with an anti-icing system or a de-icing system. The following technologies are disclosed for such systems.

Non-Patent Literature 1 discloses the technology of using high-temperature air (bleed air) extracted from a compressor of an engine.

Non-Patent Literature 2 discloses the technology of using an electrothermal heater obtained by attaching a heating wire or the like.

Non-Patent Literature 3 discloses the technology of attaching a rubber membrane, such as a de-icing boot, to the leading edge of a main wing or an empennage and feeding air to the rubber membrane for inflation, thus using a shape change of the rubber membrane.

Patent Literatures 1 and 2 disclose the technology of applying coating in advance to a portion that easily causes icing or the technology of using baking or machining of nano-structured pins.

Patent Literature 3 discloses the technology of using mechanical vibrations of actuators or the like.

CITATION LIST

Patent Literature

Patent Literature 1: Japanese Patent Application Laid-open No. 2012-26381 (Coating)
Patent Literature 2: WO 2008087861 (Machining of nano-structured pins)
Patent Literature 3: US Patent Application Laid-open No. 2013032671

Non-Patent Literature

Non-Patent Literature 1: Japan Aeronautical Engineers' Association, "Aeronautics—Course 3, Aircraft System", pp. 200-202
Non-Patent Literature 2: Japan Aeronautical Engineers' Association, "Aeronautics—Course 8, Jet Engine (Structure)", p. 120
Non-Patent Literature 3: Public Relations of Japan Airlines, "Practical Dictionary of Aviation Terms", Asahi Sonorama, pp. 133-134

DISCLOSURE OF INVENTION

Technical Problem

Regarding the technology of using bleed air, if the output of the engine is low, the temperature of the extracted air is also low, and thus the anti-icing or de-icing effect is reduced. Additionally, the output of the engine is reduced by the extraction, which leads to demerits such as an increase in fuel flow and an increase in fuel consumption rate.

Regarding the technology of using an electrothermal heater, a hollow structure such as a wing of the airframe can be subjected to machining such as attaching an electrothermal heater to the inside thereof. However, such machining is difficult to perform on a thin member such as a fan of the engine, and attaching the electrothermal heater to the surface of the thin member is not realistic because of an aerodynamic influence.

Regarding the technology of using a de-icing boot, in which air extracted from the compressor of the engine is used for activation, the de-icing boot needs a mechanical structure inside of the wing and complicates the structure. Additionally, the boot needs to be replaced with a period of two to three years.

Regarding the technology of using coating, baking, or machining of nano-structured pins, it is difficult to apply the technology to a fan blade of the engine particularly from the perspective of durability.

Regarding the technology of using mechanical vibrations of actuators or the like, the structure is complicated and this causes problems of maintainability and an increase in weight.

In view of the circumstances as described above, it is an object of the present invention to provide a fan blade, an engine, and a structure with anti-icing and de-icing functions, which are capable of efficiently performing anti-icing or de-icing with a simple structure.

Solution to Problem

To achieve the object described above, a fan blade according to an embodiment of the present invention is a fan blade, which is disposed on an air inlet side of an engine, including: a fan blade main body made of a carbon fiber reinforced plastic; and a pair of energizing units that are provided on a leading edge side and a trailing edge side of a heating region of the fan blade main body, and pass current through the fan blade main body.

The fan blade according to an embodiment of the present invention includes a carbon fiber reinforced plastic (CFRP), which includes a carbon fiber having conductivity and a matrix material such as an epoxy resin material having insulating property, and thus the fan blade uses the property of generating heat by passing current through itself. In other words, the pair of energizing units for passing current through the fan blade main body are provided to the leading edge side and the trailing edge side of the fan blade main body made of CFRP, and the fan blade main body is heated by applying voltage between the energizing units and passing current through itself, thus performing anti-icing or de-icing. Consequently, anti-icing or de-icing can be performed with a simple structure.

For a region for which anti-icing or de-icing is to be performed by heating, positions in which the pair of energizing units are attached are adjustable. Thus, the pair of energizing units are attached to the heating region of the fan blade main body, and can thus be efficiently applied to a heating region where an icing phenomenon occurs.

In the fan blade according to an embodiment of the present invention, if the voltage applied to the pair of energizing units or the current is controlled, the temperature of the heating region can be controlled. Thus, if such a fan blade is used for anti-icing, the applied voltage or current only needs to be controlled in accordance with ambient temperature, and if de-icing is performed, the applied voltage or current only needs to be controlled in accordance with the amount of icing.

From the above, the fan blade according to an embodiment of the present invention can efficiently perform anti-icing or de-icing with a simple structure.

In the fan blade according to an embodiment of the present invention, the fan blade main body may include carbon fiber exposing portions, from which a carbon fiber included in the carbon fiber reinforced plastic is exposed, in respective positions corresponding to the pair of energizing units, and the pair of energizing units may include a pair of electrodes that are disposed in the carbon fiber exposing portions and pass current through the fan blade main body, and a conductive paste that bonds the pair of electrodes and the carbon fiber exposing portions to each other.

The electrodes and the fan blade main body are bonded to each other by the conductive paste, and thus the bonding property with the carbon fiber and a contact area increase. Thus, a local temperature rise and a conduction failure can be inhibited in the portions in which the electrodes and the fan blade main body are attached, and power consumption can be suppressed. This allows an effective temperature rise to be obtained even at low voltage.

The fan blade according to an embodiment of the present invention may further include: a sheath that covers an electrode on the leading edge side in the pair of electrodes, together with the leading edge side of the fan blade main body; and a guard that covers an electrode on the trailing edge side in the pair of electrodes, together with the trailing edge side of the fan blade main body.

The configuration in which the electrodes are covered with the sheath and the guard is employed, and thus an aerodynamic influence adversely affected by the electrodes can be avoided. A conductive metal having stiffness is employed as a member of the sheath and the guard, which allows more efficient heating.

In the fan blade according to an embodiment of the present invention, the pair of energizing units may include a sheath that is made of a conductive metal and covers the leading edge side of the fan blade main body, a guard that is made of a conductive metal and covers the trailing edge side of the fan blade main body, a first conductive paste interposed between the sheath and the leading edge side of the heating region of the fan blade main body, and a second conductive paste interposed between the guard and the trailing edge side of the heating region of the fan blade main body, and a pair of electrodes that are connected to regions close to the fan disk in the sheath and the guard and pass current through the fan blade main body via the sheath and the first conductive paste and via the guard and the second conductive paste, and the fan blade may further include an insulating paste interposed in regions between the fan blade main body and the sheath and between the fan blade main body and the guard, in which the first conductive paste and the second conductive paste are not interposed.

This allows the length of the laid electrode wires to be shortened.

An engine according to an embodiment of the present invention includes: a rotary shaft; a fan disk provided to an air inlet side of the rotary shaft; a fan blade detachably attached to the fan disk, the fan blade including a fan blade main body made of a carbon fiber reinforced plastic, and a pair of energizing units that are provided on a leading edge side and a trailing edge side of a heating region of the fan blade main body, and pass current through the fan blade main body; and a pair of connection terminals that are provided to the fan disk side and the fan blade side to correspond to each of the energizing units and are electrically connected to each other to pass current through a power supply on the fan disk side and the energizing units when the fan blade is attached to the fan disk.

This allows anti-icing or de-icing to be efficiently performed with a simple structure.

In the engine according to an embodiment of the present invention, the fan disk includes an engaging groove with which a dovetail of the fan blade is to be engaged, and the pair of connection terminals are provided to elastically come into contact with a bottom portion of the engaging groove and an end surface of the dovetail.

This allows the fan blade to be replaced by a simple operation.

The engine according to an embodiment of the present invention may further include a spinner that is provided to a front-side tip of the rotary shaft and houses a battery that is a power source on the fan disk side.

This allows a configuration for power supply to be simplified.

The engine according to an embodiment of the present invention may further include a slip ring that is attached to the rotary shaft and is used to externally supply power on the fan disk side.

This allows power to be externally supplied.

A structure with anti-icing and de-icing functions according to an embodiment of the present invention includes: a plate-like member that is made of a carbon fiber reinforced plastic and includes an icing region made by an air flow; and a pair of energizing units that are connected to a surface of the plate-like member to include the icing region, and pass current through the plate-like member.

The structure with anti-icing and de-icing functions includes a fan blade, an engine, an engine nacelle for an aircraft, compressor stator vane, a wing of an airframe, a turbine blade for power generation by wind, and the like.

Advantageous Effects of Invention

According to the present invention, it is possible to efficiently perform anti-icing or de-icing with a simple structure.

MODE(S) FOR CARRYING OUT THE INVENTION

Hereinafter, embodiments of the present invention will be described with reference to the drawings.

[Configuration of Jet Engine]

Figure 1:
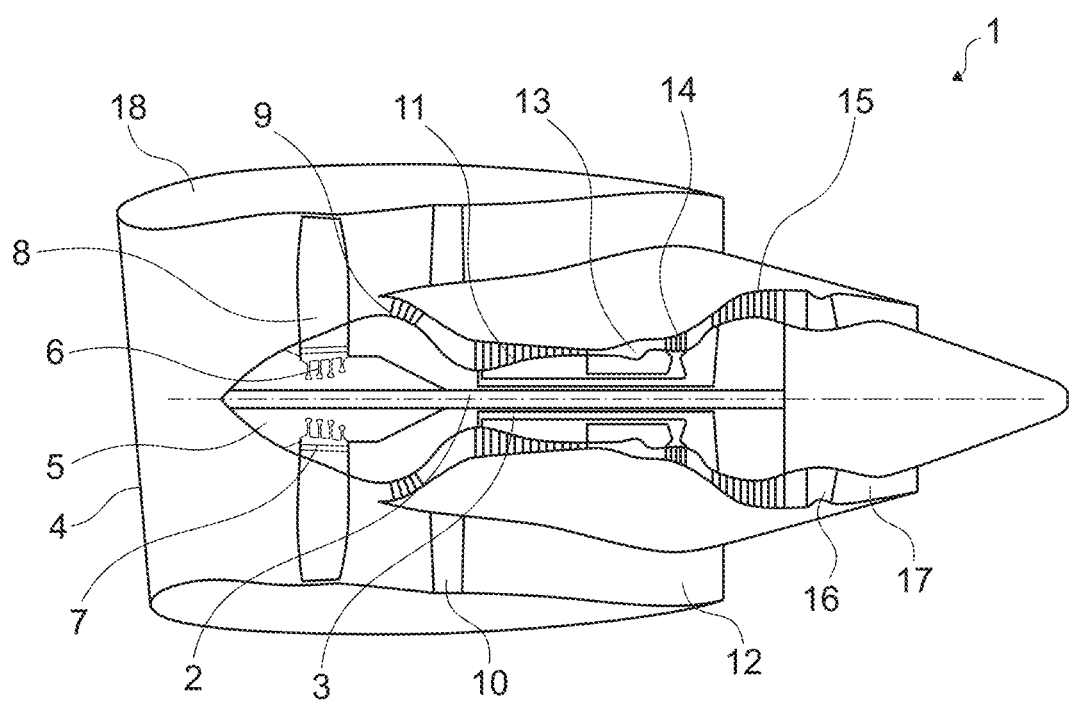
FIG. 1 is a schematic view of a configuration of a jet engine according to an embodiment of the present invention.

FIG. 1 is a schematic view of a configuration of a jet engine according to an embodiment of the present invention.

A jet engine 1 includes a low-pressure shaft 2 and a high-pressure shaft 3, which are rotary shafts and disposed at the center.

A spinner 5, a fan disk 6, a low-pressure compressor 9, and a low-pressure turbine 15 are attached to the low-pressure shaft 2 from the air inlet 4 side, and a plurality of fan blades 8 are attached to the outer circumference of the fan disk 6 via dovetails 7.

The low-pressure compressor 9, a high-pressure compressor 11, a combustor 13, a high-pressure turbine 14, the low-pressure turbine 15, a strut 16, and a core nozzle 17 are disposed downstream of the fan blades 8. A fan exit guide vane 10 and a bypass nozzle 12 are disposed in a separate flow channel on the outer circumference of the above-mentioned components and in a gap between those components and an engine nacelle 18.

The high-pressure compressor 11 and the high-pressure turbine 14 are attached to the high-pressure shaft 3.

In the jet engine 1 thus configured, icing occurs from supercooled droplets in the spinner 5 or the fan blades 8 in the vicinity of the air inlet 4. Such icing causes a reduction in aerodynamic performance due to a change in shape and a mechanical damage due to falling ice blocks. Such problems will be solved by the fan blades 8 described below.

[Configuration of Fan Blade]

Figure 2:
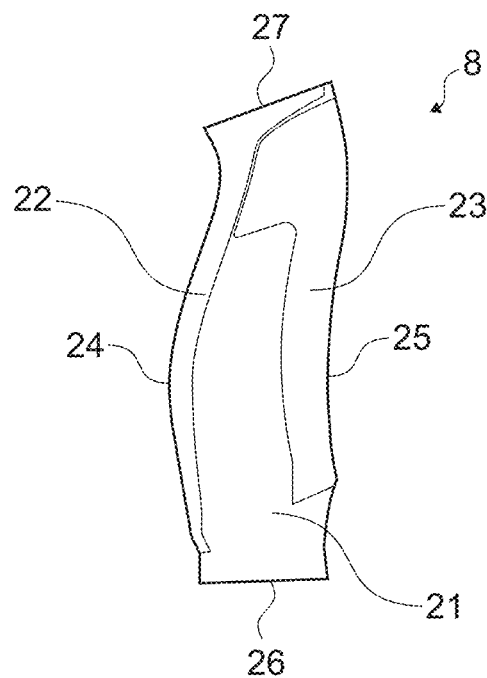
FIG. 2 is a side view of a basic configuration of a single fan blade shown in FIG. 1.
Figure 3:
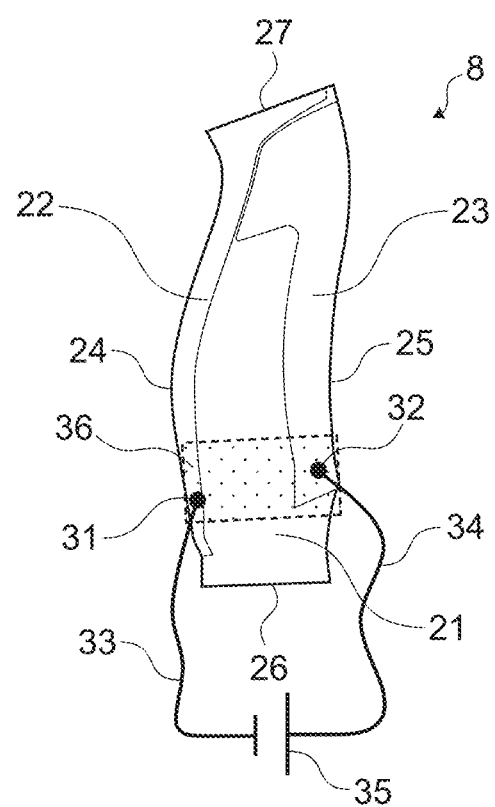
FIG. 3 is a schematic view of a configuration of the fan blade according to the embodiment of the present invention.

FIG. 2 is a side view of a basic configuration of a single fan blade shown in FIG. 1. FIG. 3 is a schematic view of the configuration of the fan blade according to the embodiment of the present invention.

The fan blade 8 is disposed on the air inlet 4 side of the engine. The fan blade 8 includes a fan blade main body 21, a sheath 22 disposed on a leading edge 24 side of the fan blade main body 21, and a guard 23 disposed on a trailing edge 25 side of the fan blade main body 21.

The fan blade main body 21 is made of a carbon fiber reinforced plastic (CFRP; hereinafter referred to as "CFRP") and is typically a plate-like solid molded product. The CFRP is obtained by, for example, laminating a carbon fiber, as a reinforced fiber, to have quasi-isotropy and using an epoxy resin as a matrix.

The sheath 22 is made of a conductive metal having stiffness and covers a region ranging from a hub side 26, which is the base of the fan blade main body 21, to a tip side 27, which is the tip of the fan blade main body 21, on the leading edge 24 side of the fan blade main body 21.

The guard 23 is also made of a conductive metal having stiffness and covers a region ranging from the hub side 26 to the tip side 27 on the trailing edge 25 side of the fan blade main body 21.

The sheath 22 and the guard 23 are components for coping with bird strikes originally. In the fan blade 8 according to this embodiment, the sheath 22 and the guard 23 are separated so as not to come into contact with each other and are electrically isolated from each other.

As shown in FIG. 3, the fan blade 8 according to this embodiment includes a pair of energizing units 31 and 32 that are provided on the leading edge 24 side and the trailing edge 25 side of a heating region 36 of the fan blade main body 21 and pass current through the fan blade main body 21.

Here, in the fan blade 8 of the jet engine 1 of an aircraft, the hub side 26 of the leading edge 24 has a low rotating speed and thus tends to have the largest amount of icing, and the tip side 27 has a high rotating speed and ice is easy to fall away due to a centrifugal force or the like and thus tends to be hardly deposited. For that reason, the heating region 36 is typically located near the hub side 26 on the leading edge 24 side. The measures against anti-icing or de-icing in the heating region 36 are important.

The energizing units 31 and 32 are respectively disposed on the leading edge 24 side and the trailing edge 25 side of the heating region 36 so as to be sandwiched between the front surface of the fan blade main body 21 and the rear surface of the sheath 22 and between the front surface of the fan blade main body 21 and the rear surface of the guard 23.

The energizing units 31 and 32 are respectively configured by bonding electrodes, which are configured by removing the insulating coating at the tips of electric wires with insulating coating 33 and 34, to a gap between the front surface of the fan blade main body 21 and the rear surface of the sheath 22 and to a gap between the front surface of the fan blade main body 21 and the rear surface of the guard 23 via a conductive paste (illustration is omitted). Here, the fan blade main body 21 includes carbon fiber exposing portions, from which the carbon fiber included in the carbon fiber reinforced plastic is exposed, in positions corresponding to the energizing units 31 and 32. The carbon fiber exposing portions are configured by, for example, shaving the epoxy resin having insulating property at those portions to expose the carbon fiber having conductivity. The conductive paste is further used in those portions, and thus current can be passed through the carbon fiber more efficiently.

For example, negative voltage is applied to the energizing unit 31 from a power supply 35 via the electric wire with insulating coating 33. For example, positive voltage is applied to the energizing unit 32 from the power supply 35 via the electric wire with insulating coating 34. The voltage is applied to the fan blade main body 21 between the energizing units 31 and 32, current passes through the fan blade main body 21, and thus the fan blade main body 21 generates heat by its resistance. A region to be heated by the heat generation includes the heating region 36, or the heating region 36 includes a region to be heated by the heat generation.

It may also be configured that positive voltage is applied to the energizing unit 31, and negative voltage is applied to the energizing unit 32.

The fan blade 8 according to this embodiment, in which the fan blade main body 21 is made of CFRP and has conductivity, uses the property of generating heat by passing current therethrough. In other words, the pair of energizing units 31 and 32 for passing current through the fan blade main body 21 are provided on the leading edge 24 side and the trailing edge 25 side of the fan blade main body 21 made of CFRP, and voltage is applied between the energizing units 31 and 32 from the power supply 35 and current passes through the fan blade main body 21 to heat the fan blade main body 21, thus performing anti-icing or de-icing for the heating region 36. At that time, heat is transmitted by heat conduction of the heat generated by the CFRP itself (fan blade main body 21) and then transmitted and spread through the CFRP (fan blade main body 21) or transmitted by heat conduction to the sheath 22 portion and the guard 23 portion, and the heat in each case works for anti-icing or de-icing. Thus, anti-icing or de-icing for the heating region 36 is performed.

The heating region 36 for which anti-icing or de-icing is performed by such heating is adjustable depending on the positions in which the pair of energizing units 31 and 32 are attached. In other words, the electric wires with insulating coating 33 and 34 are respectively laid between the fan blade main body 21 and the sheath 22 and between the fan blade main body 21 and the guard 23. Contact (electrode) positions between the fan blade main body 21 and each of the electrodes at the tips of the electric wires with insulating coating 33 and 34 are adjusted in accordance with a region to be heated.

Figure 4:
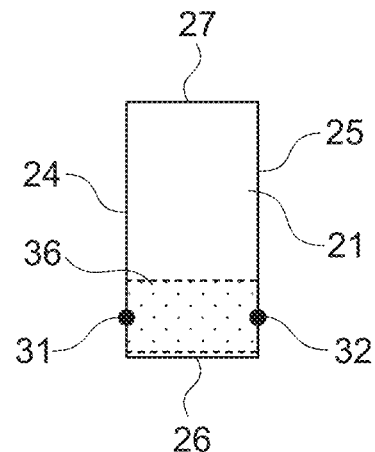
FIG. 4 is a diagram showing a modified example of the fan blade shown in FIG. 3.

For example, if anti-icing or de-icing is performed on the hub side 26 of the leading edge 24 side, as show in FIG. 4, the positions of the electrodes (energizing units 31 and 32) on the leading edge 24 side and the trailing edge 25 side are set close to the hub side 26. Thus, anti-icing or de-icing is efficiently performed on the hub side 26 of the leading edge 24 side.

Figure 5:
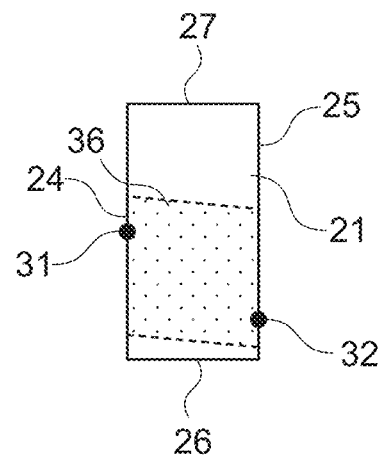
FIG. 5 is a diagram showing another modified example of the fan blade shown in FIG. 3.

Additionally, to expand the heating region 36 on the leading edge 24 side and expand the heating region 36 on a fan blade surface, as shown in FIG. 5, the energizing unit 31 and the energizing unit 32 may be configured to be displaced from each other. Thus, anti-icing or de-icing is performed in the wide range from the hub side 26 to the tip side 27 in the leading edge 24 and the trailing edge 25.

In the energizing units 31 and 32, the electrodes configured by removing the insulating coating at the tips of the electric wires with insulating coating 33 and 34 are bonded to target portions via a conductive paste (illustration is omitted), and thus current is easy to pass through the energizing units 31 and 32. For example, unlike energizing units in which electrodes are attached using copper tapes, it is conceivable that the conductive paste leads to an increase in conductive area because conductive substances enter fine asperities of a machining surface, and consequently the resistance decreases and current becomes easy to pass, thus allowing a local temperature rise and a conduction failure to be inhibited and allows power consumption to be suppressed. Note that it has been confirmed that the heating region 36 is hardly warmed with the same level of voltage if the electrodes are attached using copper tapes instead of the conductive paste. In particular, given the Joule heat, current works when having a squared value, and thus it is important how much current can pass with the same level of voltage. Thus, it is conceivable that a greater effect is produced when the electrodes and the fan blade main body 21 or the like are bonded using the conductive paste.

Additionally, in the fan blade 8 according to this embodiment, if the magnitude of the voltage or current supplied to the fan blade main body 21 via the electric wires with insulating coating 33 and 34 is changed, the temperature of generated heat and the speed of heat generation in the heating region 36 can be adjusted.

[Attachment of Fan Blade to Fan Disk and Power Supply]

Figure 6:
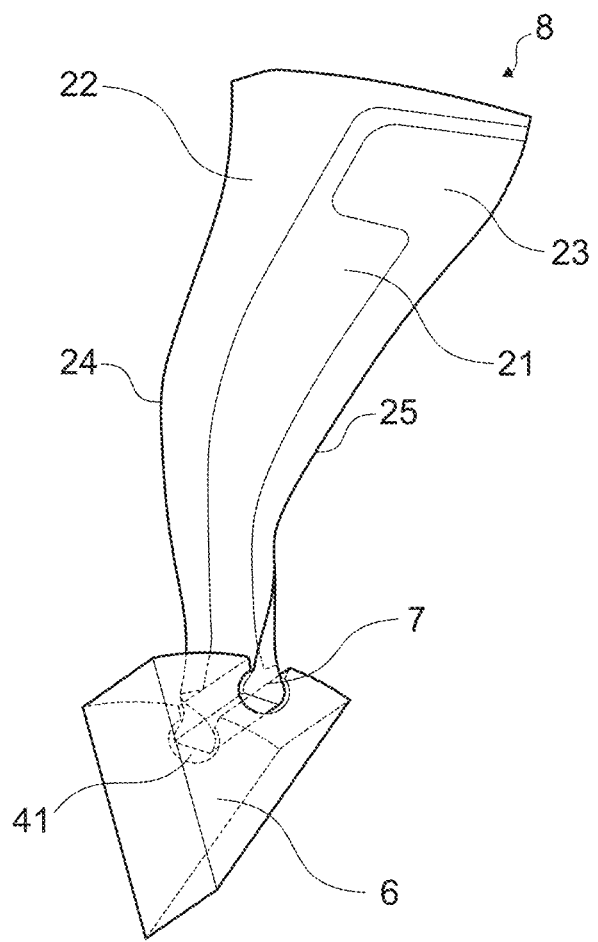
FIG. 6 is a perspective view showing a state where the fan blade is attached to a fan disk.
Figure 7:
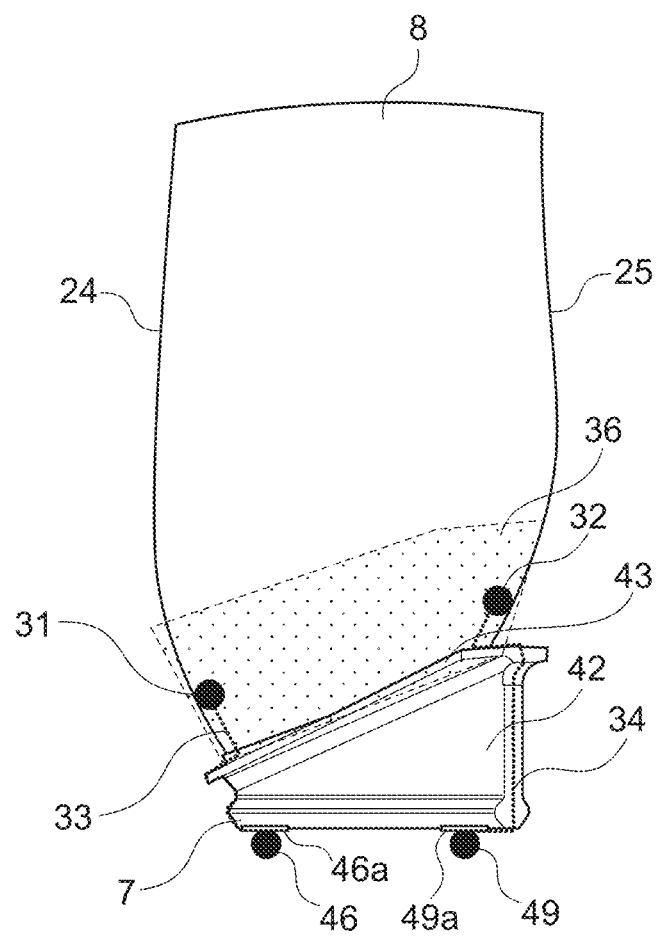
FIG. 7 is a diagram for describing a configuration of wiring for power supply to the fan blade according to the embodiment of the present invention.
Figure 8:
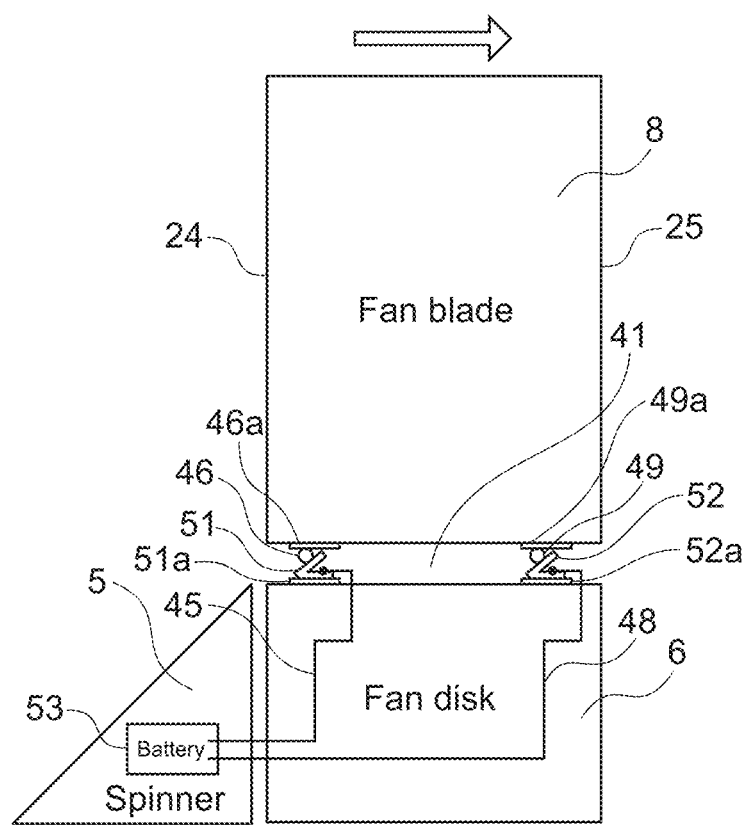
FIG. 8 is a diagram for describing a configuration of the power supply to the fan blade according to the embodiment of the present invention.

FIG. 6 is a perspective view showing a state where the fan blade 8 is attached to the fan disk 6. FIG. 7 is a diagram for describing a configuration of wiring for power supply to the fan blade 8. FIG. 8 is a diagram for describing a configuration of the power supply to the fan blade 8.

As shown in FIG. 6, the fan disk 6 includes an engaging groove 41, with which the dovetail 7 attached to the fan blade 8 is to be engaged. The end surface of the dovetail 7 and the bottom portion of the engaging groove 41 have a gap therebetween.

The dovetail 7 is inserted into the engaging groove 41 from the leading edge 24 side (see the arrow of FIG. 8), and the fan blade 8 is caused to slide to the trailing edge 25 side. Thus, the dovetail 7 is engaged with the engaging groove 41, and the fan blade 8 is attached to the fan disk 6.

As shown in FIG. 7, the dovetail 7 is attached to the hub side 26 of the fan blade 8 via a platform 43 and a shank 42.

On the end surface of the dovetail 7, connection terminals 46 and 49 are respectively attached to the leading edge 24 side and the trailing edge 25 side via insulating sheets 46a and 49a. The connection terminal 46 is connected to the energizing unit 31 on the leading edge 24 side via the electric wire with insulating coating 33. The electric wire with insulating coating 33 is wired on the leading edge 24 side of the platform 43 and the shank 42. The connection terminal 49 is connected to the energizing unit 32 on the trailing edge 25 side via the electric wire with insulating coating 34. The electric wire with insulating coating 34 is wired on the trailing edge 25 side of the platform 43 and the shank 42.

As shown in FIG. 8, on the bottom surface of the engaging groove 41 of the fan disk 6, V-shaped contact metal fittings (connection terminals) 51 and 52 are respectively provided to the positions corresponding to the above-mentioned connection terminals 46 and 49 via insulating sheets 51a and 52a.

When the dovetail 7 is engaged with the engaging groove 41 and the fan blade 8 is attached to the fan disk 6, the connection terminals 46 and 49 come into contact with the V-shaped contact metal fittings 51 and 52 and press them. Thus, the connection terminals 46 and 49 and the V-shaped contact metal fittings 51 and 52 elastically come into contact with each other on the bottom portion of the engaging groove 41 and on the end surface of the dovetail 7.

The spinner 5 houses a battery 53 that is a power source. The battery 53 and the V-shaped contact metal fittings 51 and 52 are connected to each other via electric wires with insulating coating 45 and 48, which pass through the fan disk 6 and the spinner 5. Thus, power for heating is applied to the fan blade main body 21. Use of such a configuration allows the configuration for power supply to be simplified.

Figure 9:
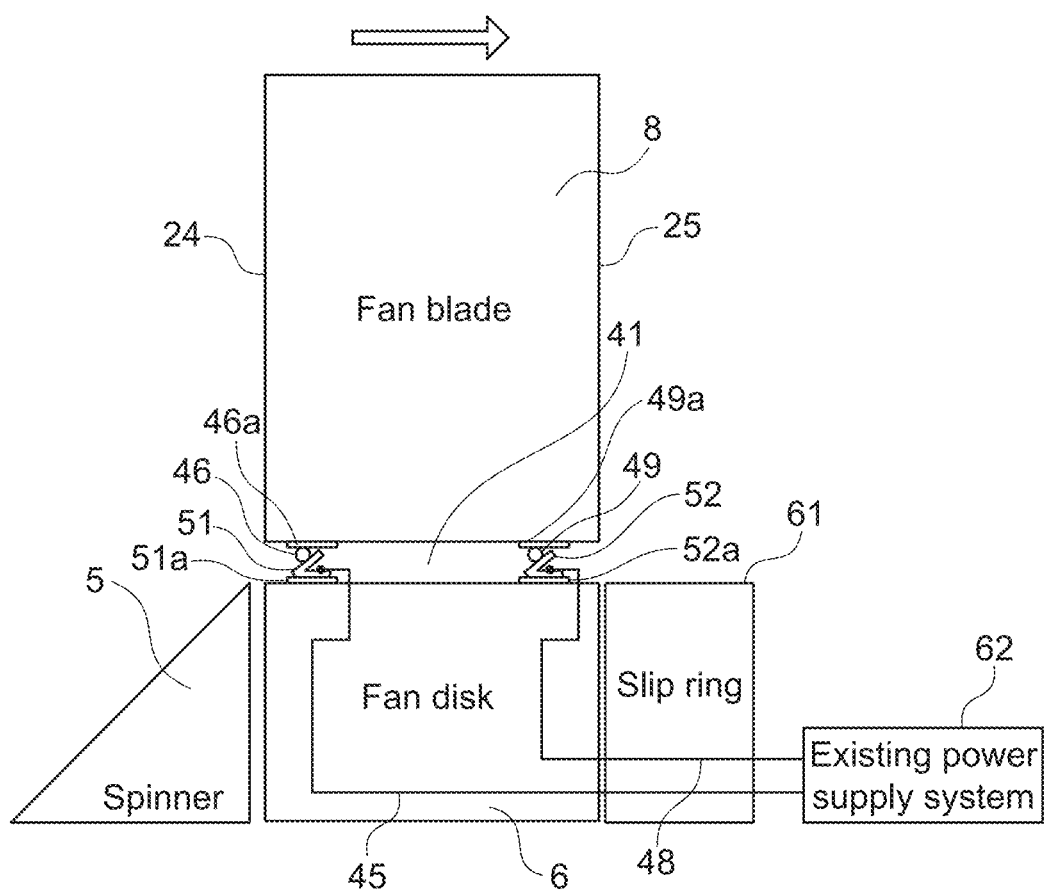
FIG. 9 is a diagram for describing another configuration of the power supply to the fan blade according to the embodiment of the present invention.

FIG. 9 is a diagram for describing another configuration of the power supply to the fan blade 8.

This configuration is to supply the power for heating from an external existing power supply system 62 to the fan blade main body 21. In this configuration, a slip ring 61 is attached to the low-pressure shaft 2 that is a rotary shaft, and power for heating the fan blade main body 21 is supplied from the existing power supply system 62 via the slip ring 61. This allows the power to be externally supplied.

[Another Configuration of Fan Blade]

Figure 10:
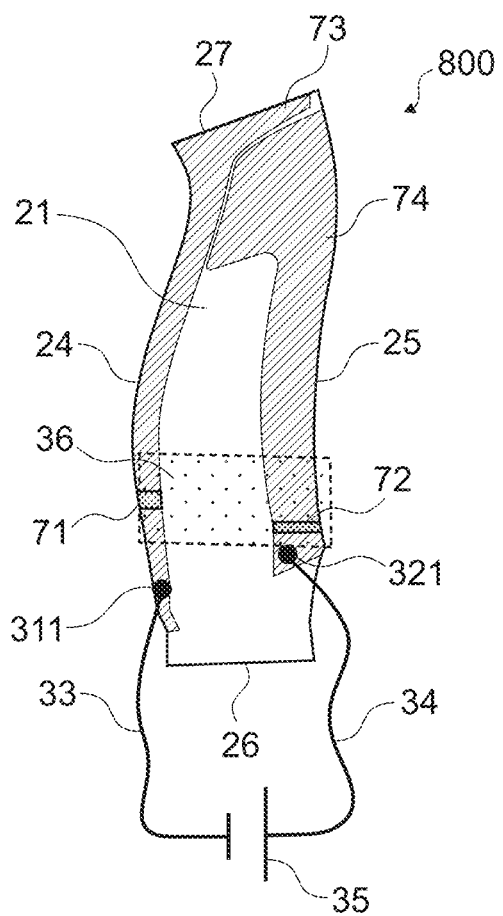
FIG. 10 is a schematic view of a configuration of a fan blade according to another embodiment of the present invention.

FIG. 10 is a schematic view of a configuration of a fan blade according to another embodiment of the present invention. In this fan blade 800, the same elements of the fan blade 8 as those shown in FIGS. 2 and 3 are denoted by the same reference symbols.

The fan blades 800 includes a pair of energizing units 310 and 320.

Those energizing units 310 and 320 include a sheath (not shown in the figure), a guard (not shown in the figure), first and second conductive pastes 71 and 72, and a pair of electrodes 311 and 321.

The sheath is made of a conductive metal having stiffness and covers the leading edge 24 side of the fan blade main body 21. The guard is also made of a conductive metal having stiffness and covers the trailing edge 25 side of the fan blade main body 21.

The first conductive paste 71 and the second conductive paste 72 are respectively interposed between the sheath and the fan blade main body 21 on the leading edge 24 side of the heating region 36 of the fan blade main body 21 and between the guard and the fan blade main body 21 on the trailing edge 25 side of the heating region 36 of the fan blade main body 21.

The pair of electrodes 311 and 321 are respectively connected to regions, of the sheath and the guard, close to the fan disk (regions close to hub side 26) to pass current through the fan blade main body 21 via the sheath and the first conductive paste 71 and via the guard and the second conductive paste 72.

Furthermore, the fan blades 800 includes insulating pastes 73 and 74 interposed in regions between the fan blade main body 21 and the sheath and between the fan blade main body 21 and the guard, in which the first and second conductive pastes 71 and 72 are not interposed. Note that hatched portions 73 and 74 in the figure are regions in which the insulating pastes are interposed.

In the fan blade 8 shown in FIGS. 2 and 3, the electrode wires (electric wires with insulating coating 33 and 34) are used to reach the electrodes for applying voltage to the fan blade main body 21 made of CFRP. However, in the fan blade 800 according to this embodiment, the sheath and the guard are diverted to electrode wires. In such a case, the electrode 311 between the electric wire with insulating coating 33 and the sheath, and the electrode 321 between the electric wire with insulating coating 34 and the guard are set at the positions close to the hub side 26, and voltage is applied to the sheath and the guard from those positions. Additionally, two types of the conductive paste 71 and 72 and the insulating pastes 73 and 74 are used for bonding the sheath and the guard to the fan blade main body 21 made of CFRP. The conductive paste 71 and 72 are used for the portions having electrodes between the sheath or the guard and the fan blade main body 21 made of CFRP (portions at which voltage is applied to the fan blade main body 21), and the insulating paste 73 and 74 are used for the other portions. Thus, the length of the electrode wires (electric wires with insulating coating 33 and 34) to be laid can be shortened.

[Configuration of Energizing Unit]

Figure 11:
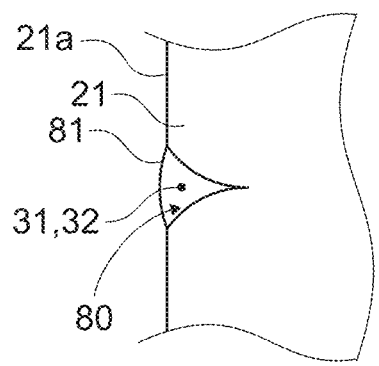
FIG. 11 is a diagram of a configuration of an energizing unit according to the present invention.

FIG. 11 is a diagram of a configuration example of the energizing unit according to the present invention. Additionally, FIG. 12 is a diagram of another configuration example of the energizing unit according to the present invention.

In the first embodiment, the electrodes of the energizing units 31 and 32 may be configured so as to be connected to the flat fan blade main body 21 via a conductive paste. However, it is desirable to enlarge a contact area of the electrodes and the fan blade main body 21 made of CFRP in order to easily pass current between each electrode and the fan blade main body 21 made of CFRP.

For example, as shown in FIG. 11, in the case where the electrode (energizing unit 31 or 32) is attached to an end 21a of the plate-like fan blade main body 21 made of CFRP, a wedge-shaped groove 80 may be provided to the end 21a, and the electrode (energizing unit 31 or 32) and the fan blade main body 21 may be bonded to each other within the groove 80 by using a conductive paste 81.

Figure 12:
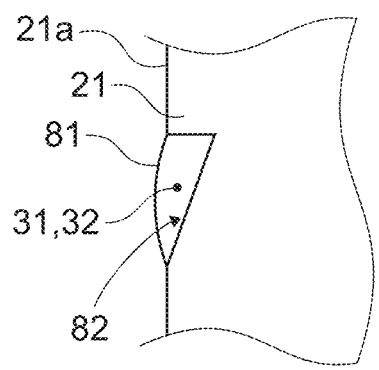
FIG. 12 is a diagram of another configuration of the energizing unit according to the present invention.

Additionally, as shown in FIG. 12, it may also be possible to provide a groove 82, which is obliquely machined in the end 21a, and to bond the electrode (energizing unit 31 or 32) and the fan blade main body 21 to each other within the groove 82 by using the conductive paste 81.

This allows the carbon fiber to be exposed by shaving the epoxy resin and also allows an increase in contact area of the electrode (energizing unit 31 or 32) and the carbon fiber of the fan blade main body 21 made of CFRP.

[Results of Experiments]

Figure 13:
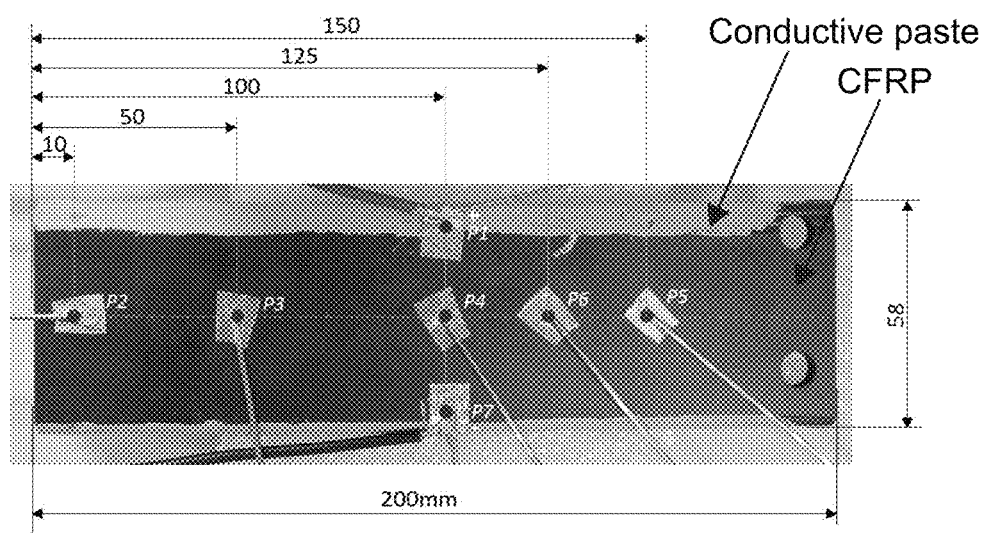
FIG. 13 is a picture showing experimental examples according to the present invention.
Figure 14:
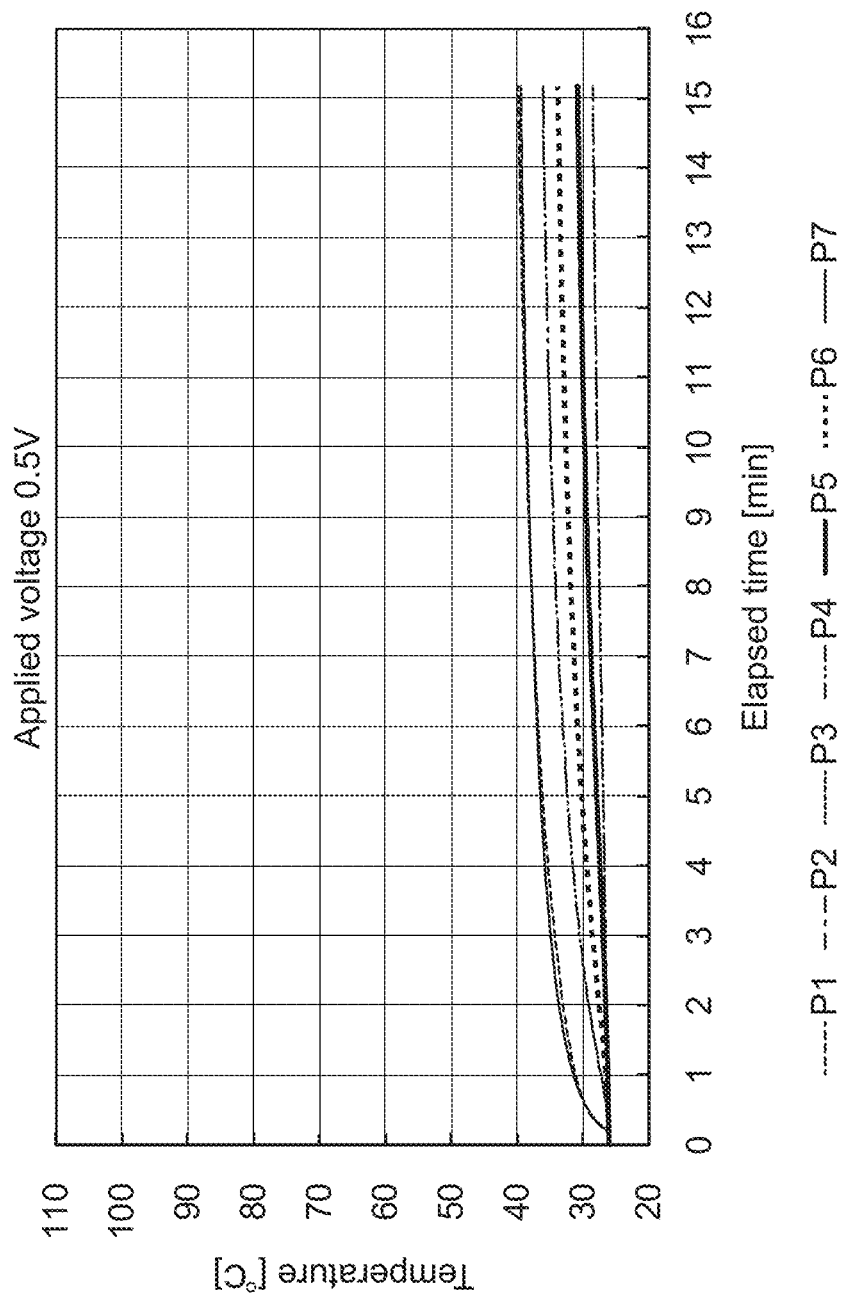
FIG. 14 is a graph showing results of the experiments described in FIG. 13.
Figure 15:
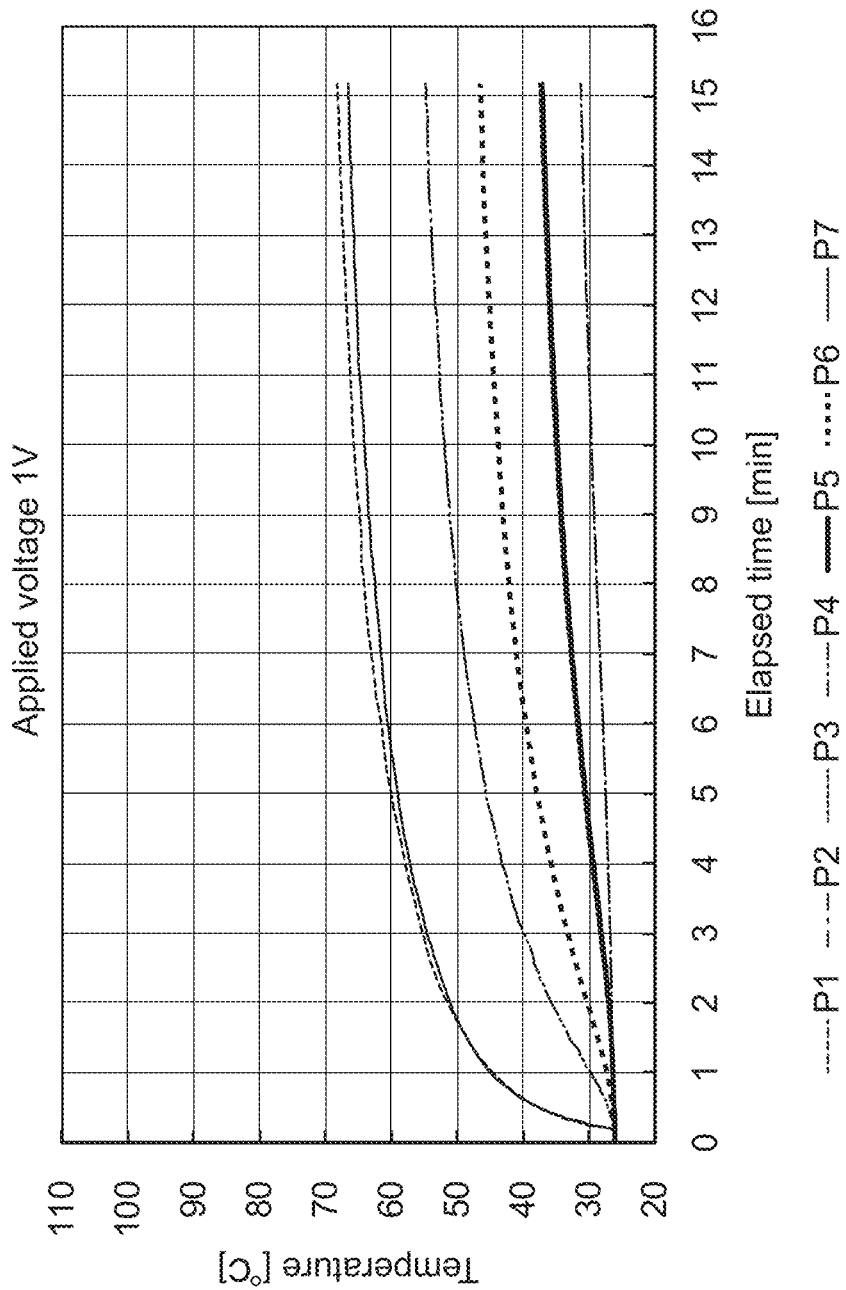
FIG. 15 is a graph showing results of the experiments described in FIG. 13.
Figure 16:
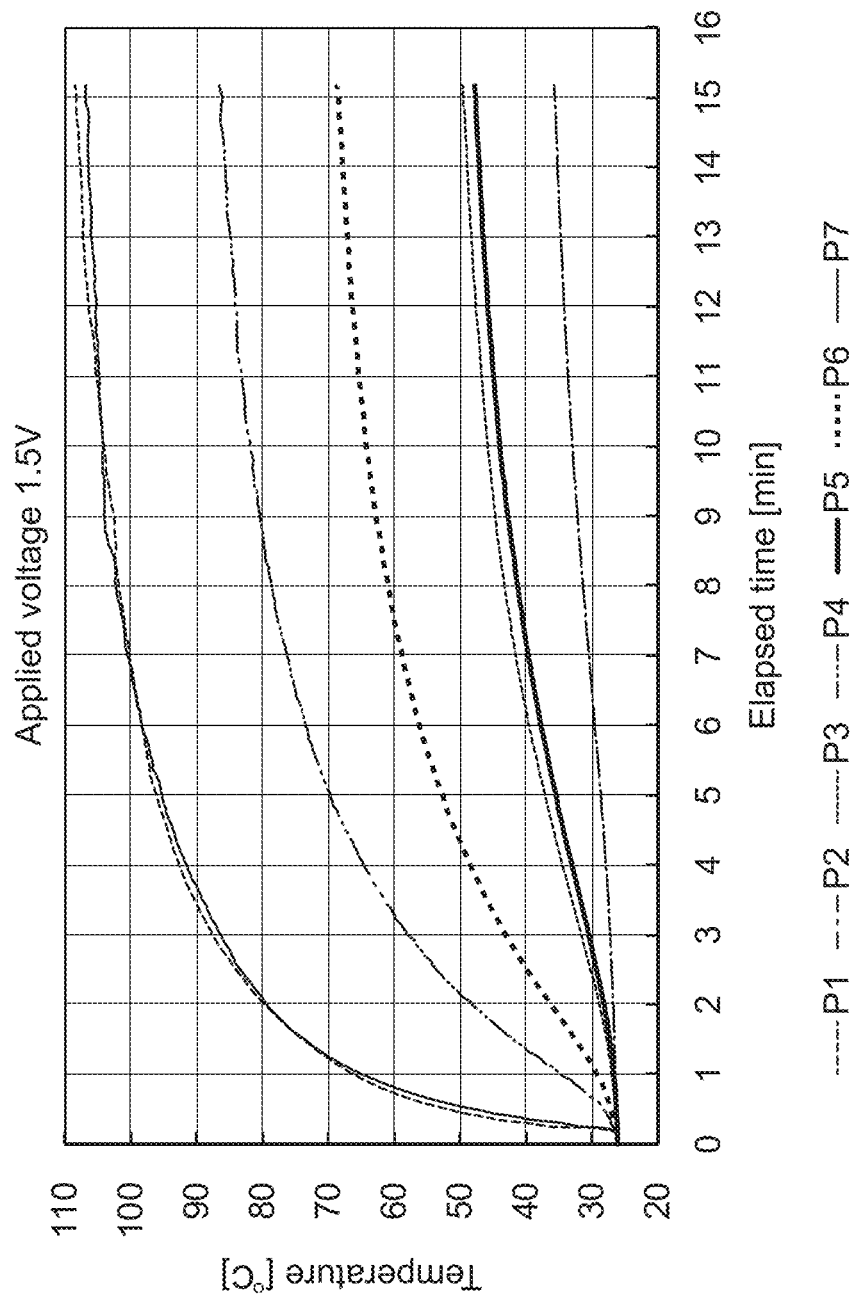
FIG. 16 is a graph showing results of the experiments described in FIG. 13.
Figure 17:
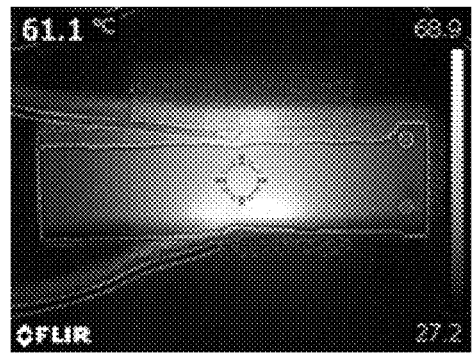
FIG. 17 is a picture showing results of the experiments described in FIG. 13.

FIG. 13 is a picture showing experimental examples according to the present invention. FIGS. 14 to 16 are graphs showing results of the experiments described in FIG. 13 and showing changes in temperature with respect to the elapsed time when the applied voltage is changed to 0.5 V, 1 V, and 1.5 V. FIG. 17 is a picture showing results of the experiments described in FIG. 13 and showing measurement results by a thermocamera after the elapse of 15 minutes at the applied voltage of 1 V.

Figure 18:
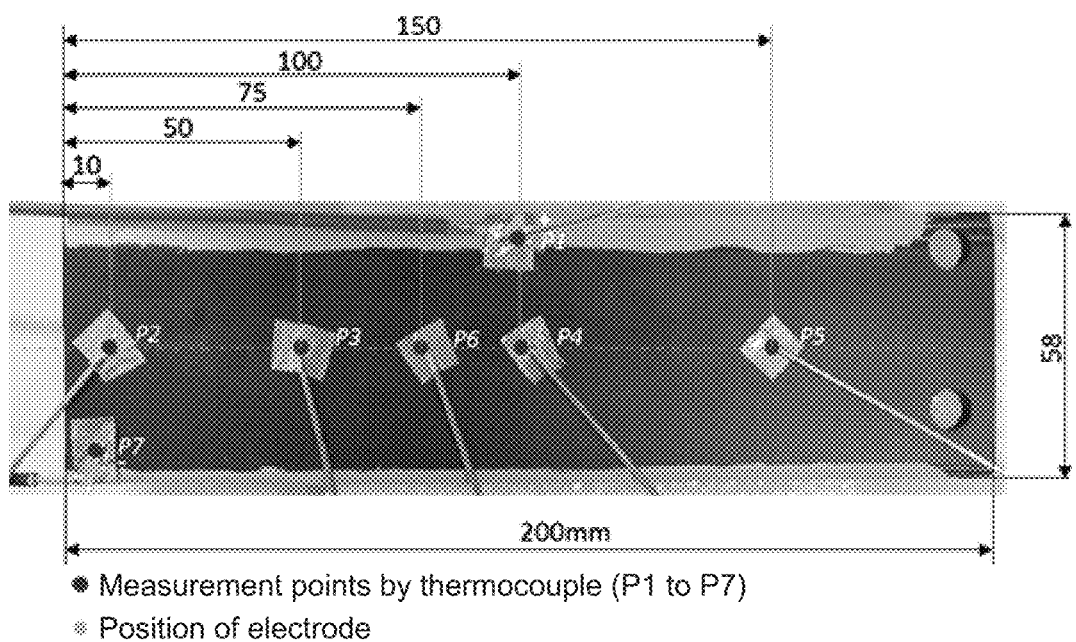
FIG. 18 is a picture showing other experimental examples according to the present invention.
Figure 19:
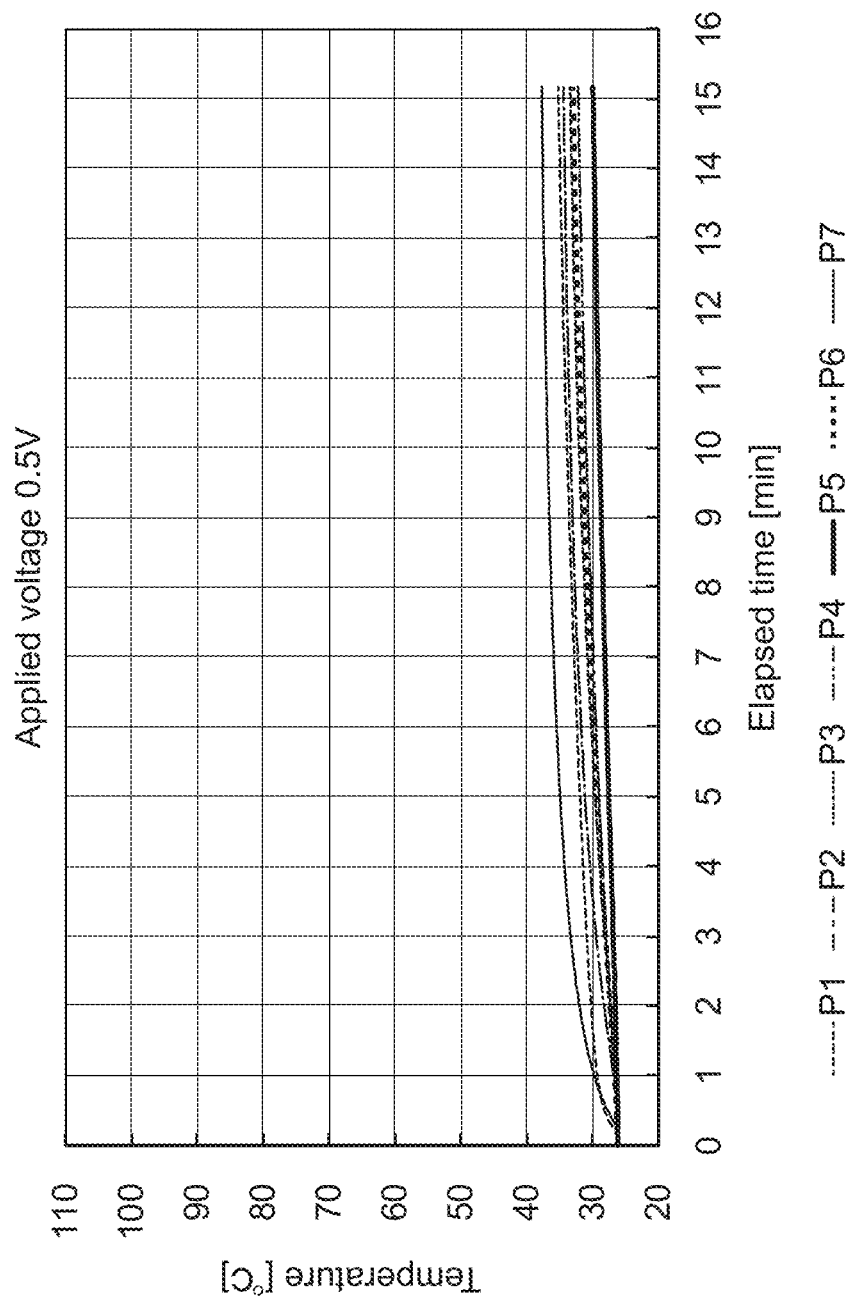
FIG. 19 is a graph showing results of the experiments described in FIG. 18.
Figure 20:
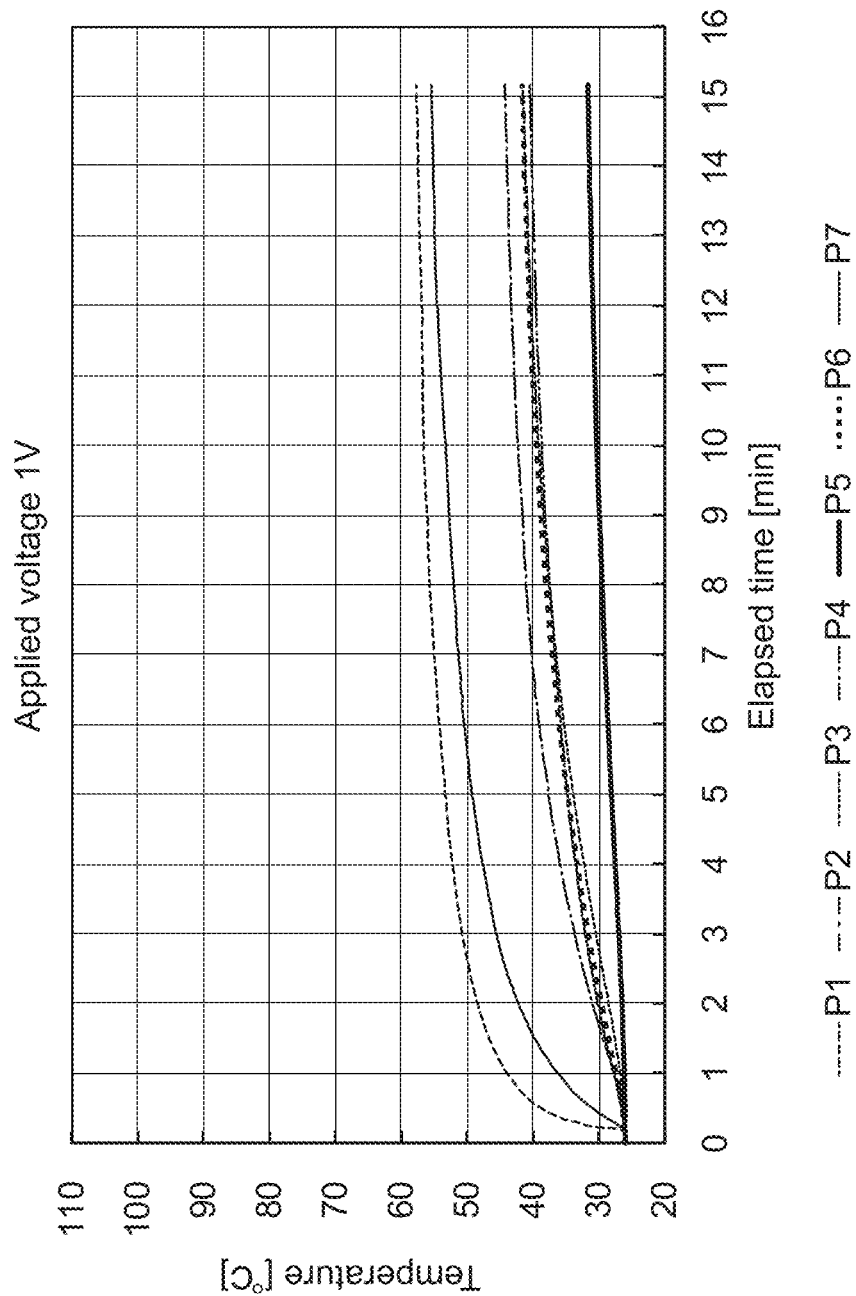
FIG. 20 is a graph showing results of the experiments described in FIG. 18.
Figure 21:
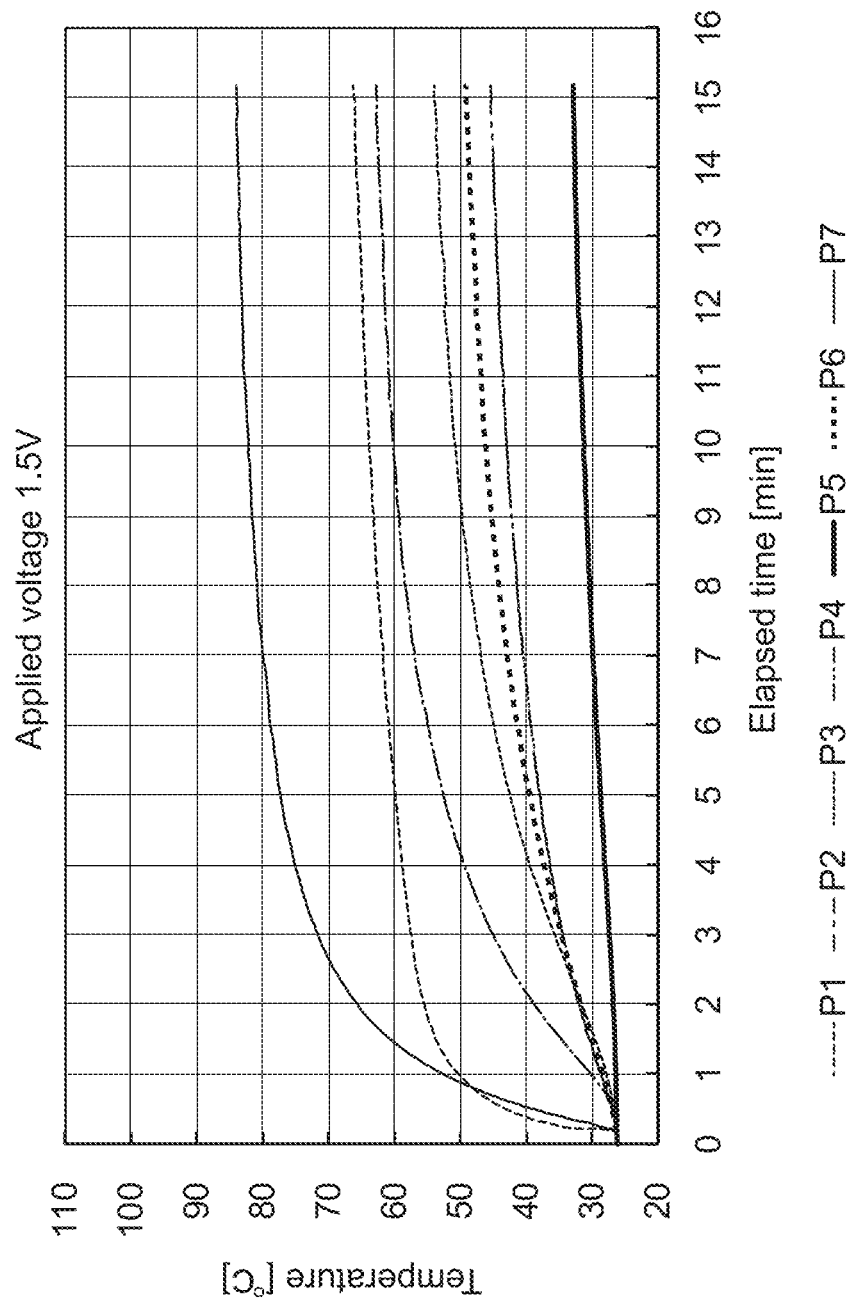
FIG. 21 is a graph showing results of the experiments described in FIG. 18.
Figure 22:
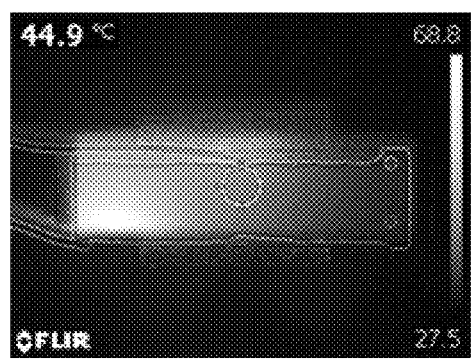
FIG. 22 is a picture showing results of the experiments described in FIG. 18.

FIG. 18 is a picture showing other experimental examples according to the present invention. FIGS. 19 to 21 are graphs showing results of the experiments described in FIG. 18 and showing changes in temperature with respect to the elapsed time when the applied voltage is changed to 0.5 V, 1 V, and 1.5 V. FIG. 22 is a picture showing results of the experiments described in FIG. 18 and showing measurement results by a thermocamera after the elapse of 15 minutes at the applied voltage of 1 V.

FIGS. 14 to 16 and FIGS. 19 to 21 show the results of temperature rise obtained when voltage is applied between both ends of a CFRP test piece as shown in FIGS. 13 and 18. The test piece has a length of 200 mm, a width of 58 mm, and a thickness of 4.6 mm, including a carbon fiber used as a reinforced fiber laminated at 0°, 90°, and ±45° (quasi-isotropy) and including an epoxy resin used as a matrix. Both ends of the test piece are cut into a wedge shape, and while the carbon fiber is exposed, a conductive paste is used to bond the electrode to the wedge-shaped portion of the CFRP.

On the basis of FIGS. 14 to 16 and FIGS. 19 to 21, a region in which current directly passes through the carbon fiber has a large temperature gradient, high temperature, and good responsiveness. A region in which current does not pass has characteristics of being gently warmed due to heat conduction.

On the basis of FIGS. 14 to 16 and FIGS. 19 to 21, controlling the voltage can change a temperature gradient and a maximum temperature, which makes it possible to easily perform anti-icing or de-icing.

It is found from the measurement results by a thermocamera shown in FIGS. 17 and 22 that changing the positions of the electrodes allows a heating region to be easily controlled. This makes it possible to attach electrodes in a region where icing occurs on an empirical basis and to efficiently perform anti-icing or de-icing.

[Others]

The CFRP has been recently used in approximately 50% of the weight of the airframe of an aircraft and also in a fan blade or the like, which is less affected by heat, of an engine. If the CFRP is usable or is used in a portion where the anti-icing or de-icing technology has been conventionally applied, anti-icing or de-icing can be performed using heat generation characteristics of the CFRP.

In other words, the present invention is to attach electrodes to a portion where the CFRP is applied and pass current through the CFRP for heat generation, thus performing anti-icing or de-icing. This eliminates the need for attaching new heating wires to the CFRP. Thus, machining is easily performed, and the original outer shape can be maintained, which are merits. The original outer shape can be maintained, which means that an optimal shape of a wing of the aircraft or a fan blade or the like of the engine can be aerodynamically maintained. The present invention is particularly suitable for the application to a laminar airfoil.

Additionally, the CFRP has a thermal expansion rate of almost zero and thus causes less change in shape in heat generation. This can maintain less aerodynamic influence and, in the case of the fan blade of the engine, a clearance between a fan case and a fan tip.

Furthermore, the present invention can be widely applied to various fields. The present invention can be widely applied as a structure with anti-icing and de-icing functions. In other words, such a structure only needs to include: a plate-like member that is made of a carbon fiber reinforced plastic and includes an icing region made by an air flow; and a pair of energizing units that are connected to a surface of the plate-like member to include the icing region, and pass current through the plate-like member. The plate-like member may be a plate-like solid member or may be a plate-like hollow member. The plate-like solid member can form an airfoil shape structurally thin as compared with the hollow member. Additionally, it is conceivable that the plate-like solid member has merits of quick heat conduction because of being thin, of less power consumption, and the like.

The structure with anti-icing and de-icing functions includes a fan blade, an engine, an engine nacelle for an aircraft, a compressor stator vane, a wing of an airframe, a turbine blade for power generation by wind, and the like.

The present invention is not limited to the above embodiments and can be modified or applied without departing from its technical idea, the range of which also belongs to the technical range of the present invention.

REFERENCE SIGNS LIST

1 jet engine
2 low-pressure shaft
4 air inlet
5 spinner
6 fan disk
7 dovetail
8 fan blade
21 fan blade main body
22 sheath
23 guard
24 leading edge
25 trailing edge
31 energizing unit
32 energizing unit
35 power supply
36 heating region
41 engaging groove
46 connection terminal
49 connection terminal
53 battery
61 slip ring
71 first conductive paste
72 second conductive paste
73 insulating paste
74 insulating paste
80 groove
81 conductive paste
82 groove
310 energizing unit (sheath)
311 electrode
320 energizing unit (guard)
321 electrode
800 fan blade

The invention claimed is:

1. A fan blade, which is disposed on an air inlet side of an engine, comprising:
   a fan blade main body made of a carbon fiber reinforced plastic; and
   a pair of energizing units that are provided on a leading edge side and a trailing edge side of a heating region of the fan blade main body, and pass current through the fan blade main body,
   wherein the pair of energizing units include:
      a sheath that is made of a conductive metal and covers the leading edge side of the fan blade main body;
      a guard that is made of a conductive metal and covers the trailing edge side of the fan blade main body;
      a first conductive paste interposed between the sheath and the leading edge side of the heating region of the fan blade main body, and a second conductive paste interposed between the guard and the trailing edge side of the heating region of the fan blade main body; and
      a pair of electrodes that are connected to regions close to the fan disk in the sheath and the guard and pass current through the fan blade main body via the sheath and the first conductive paste and via the guard and the second conductive paste, and
   wherein the fan blade further comprises an insulating paste interposed in regions between the fan blade main body and the sheath and between the fan blade main body and the guard, in which the first conductive paste and the second conductive paste are not interposed.

2. The fan blade according to claim 1, wherein
   the fan blade main body includes carbon fiber exposing portions, from which a carbon fiber included in the carbon fiber reinforced plastic is exposed, in respective positions corresponding to the pair of energizing units, and the pair of energizing units include
- a pair of electrodes that are disposed in the carbon fiber exposing portions and pass current through the fan blade main body, and
- a conductive paste that bonds the pair of electrodes and the carbon fiber exposing portions to each other.

3. The fan blade according to claim 1, further comprising:
a sheath that covers an electrode on the leading edge side in the pair of electrodes, together with the leading edge side of the fan blade main body; and
a guard that covers an electrode on the trailing edge side in the pair of electrodes, together with the trailing edge side of the fan blade main body.

4. An engine, comprising:
a rotary shaft;
a fan disk provided to an air inlet side of the rotary shaft;
a fan blade detachably attached to the fan disk, the fan blade including
- a fan blade main body made of a carbon fiber reinforced plastic, and
- a pair of energizing units that are provided on a leading edge side and a trailing edge side of a heating region of the fan blade main body, and pass current through the fan blade main body; and
a pair of connection terminals that are provided to the fan disk side and the fan blade side to correspond to each of the energizing units and are electrically connected to each other to pass current through a power supply on the fan disk side and the energizing units when the fan blade is attached to the fan disk,
wherein the fan disk includes an engaging groove with which a dovetail of the fan blade is to be engaged, and
wherein the pair of connection terminals are provided to elastically come into contact with a bottom portion of the engaging groove and an end surface of the dovetail.

5. The engine according to claim 4, further comprising
a spinner that is provided to a front-side tip of the rotary shaft and houses a battery that is a power source on the fan disk side.

6. The engine according to claim 4, further comprising
a slip ring that is attached to the rotary shaft and is used to externally supply power on the fan disk side.

7. The fan blade according to claim 1, wherein
the fan blade main body has property of generating heat by passing current through the fan blade main body, and
the fan blade is heated by passing current through the fan blade main body from the pair of energizing units and causing the fan blade main body to generate heat.

* * * * *